United States Patent [19]
Chattha et al.

[11] Patent Number: 5,139,994
[45] Date of Patent: * Aug. 18, 1992

[54] LOW TEMPERATURE LIGHT-OFF PLATINUM CATALYST

[75] Inventors: Mohinder S. Chattha, Northville, Mich.; William L. H. Watkins, Toledo, Ohio; Somasundaram Subramanian, Melvindale, Mich.

[73] Assignee: Ford Motor Company, Dearborn, Mich.

[*] Notice: The portion of the term of this patent subsequent to Jun. 4, 2008 has been disclaimed.

[21] Appl. No.: 621,134

[22] Filed: Nov. 28, 1990

[51] Int. Cl.$^5$ .................. B01J 21/04; B01J 21/06; B01J 23/42
[52] U.S. Cl. .................................. 502/334; 423/213.5
[58] Field of Search .................. 502/334; 423/213.5

[56] References Cited

U.S. PATENT DOCUMENTS

| | | | |
|---|---|---|---|
| 2,894,901 | 7/1959 | Gilbert et al. | 208/136 |
| 4,134,860 | 1/1979 | Hindin et al. | 252/466 PT |
| 4,219,447 | 8/1980 | Wheelock | 252/466 PT |
| 4,237,030 | 12/1980 | Noguchi et al. | 252/432 |
| 4,478,797 | 10/1984 | Diwell et al. | 423/213.5 |
| 4,650,782 | 3/1987 | Onal | 502/339 |
| 4,992,405 | 2/1991 | Chattha et al. | 502/303 |
| 5,024,824 | 6/1991 | Henk et al. | 423/213.5 |

FOREIGN PATENT DOCUMENTS 306945 3/1988 European Pat. Off. .
430435 6/1991 European Pat. Off. .

Primary Examiner—W. J. Shine
Attorney, Agent, or Firm—Joseph W. Malleck; Roger L. May

[57] ABSTRACT

A method of making an oxidation catalyst for use in automotive exhaust gas treatment by impregnating with platinum a mechanical carrier having a support comprised substantially of alumina to produce a composite having, by weight, 1-5% platinum, and impregnating (by incipient wetness) the composite with an organo-titanium compound (titanium butoxide) and decomposing such compound to form a discontinuous titanium oxide phase on or adjacent the exposed portions of the composite.

A method of treating automotive exhaust gases carrying hydrocarbons is also disclosed, comprising initiating combustion in an internal combustion engine fueled with fossil fuel, placing an oxidation catalyst at a location in close proximity to the source of such emissions, and exposing at such location the exhaust gases to a catalyst consisting of an $Al_2O_3$ substrate, a continuous coating of platinum in an amount of 0.1-5% by weight, and a complexing discontinuous phase of titania thereover in an amount of 0.1-2.5%.

6 Claims, 5 Drawing Sheets

LOW TEMPERATURE LIGHT-OFF PLATINUM CATALYST

BACKGROUND OF THE INVENTION

1. Technical Field

This invention relates to the science of initiating chemical conversions by catalysts, and more particularly to the technology of reducing the light-off temperature to improve catalyst efficiency.

2. Discussion of the Prior Art

Conventional platinum automotive exhaust catalysts have a propane light-off temperature of about 495° C. Light-off temperature means the temperature at which a 50% conversion efficiency is reached with respect to the gas being converted. It is desirable to achieve lower light-off temperature for hydrocarbon oxidation because hydrocarbon emissions during cold-start operation of an automobile can be significant and, if untreated, can significantly affect the emission content that is released. For example, during the first 60 seconds of cold-start, 65-70% of hydrocarbon emissions remain unconverted.

The prior art has not recognized that titania can lower the light-off temperature for hydrocarbon when (i) used in concert with platinum and (ii) applied in a certain manner. Heretofore, titania has been used as a continuous washcoat over platinum to impart resistance to $SO_2$ (see U.S. Pat. No. 4,650,782), or as a more stable base on $Al_2O_3$ for overcoating platinum (see U S. Pat. Nos. 2,894,901; 4,219,447; 4,237,030; 4,134,860; and 4,478,797).

One of the applicants herein has previously disclosed, in copending U.S. Ser. No. 440,525, filed Nov. 22, 1989, now U.S. Pat. No. 5,102,853, commonly assigned to the assignee herein, how a palladium/alumina catalyst can be modified by application of organo-titanates to increase high temperature conversion efficiency. However, differing chemical complexing abilities of precious metals (which result from differing electronegativities and differing thermodynamic characteristics of reactions involving the precious metal) cause researchers to believe such success is highly selective to palladium. For example, palladium is more reactive to $O_2$ than platinum. Thus, the direction of the prior art would not make it obvious to realize that organo-titanates might have a low temperature conversion efficiency improvement as well as enhancing sulfur poisoning resistance. It would be reasonable to assume that platinum would not react the same with organo-titanates and not only would not improve high temperature conversion efficiency but would fail also to enhance low temperature conversion efficiency.

What is needed is an oxidation catalyst that is more effective to provide hydrocarbon conversion at light-off temperatures as low as 150° C.

SUMMARY OF THE INVENTION

The invention, in a first aspect, is a method of making an oxidation catalyst for use in automotive exhaust gas treatment, comprising: (a) impregnating with platinum a mechanical carrier having a support comprised substantially of alumina to produce a composite having by weight 0.1-5% platinum; and (b) impregnating the composite with an organo-titanium compound and decomposing such compound to form a discontinuous titanium oxide phase on or adjacent the exposed portions of the composite.

Preferably, the platinum is impregnated by incipiently wetting a mixture of alumina with chloroplatinic acid solution in ethanol/water, the chloroplatinic acid being present in said solution in an amount of about 0.1-5% by weight of alumina substrate. The organo-titanium compound is impregnated preferably by use of titanium butoxide carried in an organic solvent and such solution is deposited on and forms part of the incipient wetted mixture.

Another aspect of this invention is a method of treating automotive exhaust gases carrying hydrocarbons, the method of use comprising: (a) initiating combustion in an internal combustion engine fueled with fossil fuel; (b) placing an oxidation catalyst at a location in close proximity to the source of such emissions; and (c) exposing at said location the exhaust gases to a catalyst consisting of an alumina substrate, a dispersion of platinum particles on said substrate in an amount of 0.1-5% by weight of the alumina substrate, said platinum being in the proximity of a discontinuous phase of titanium oxide present in an amount of 0.1-2.5% by weight of the catalyst, said catalyst having an oxidation light-off temperature as low as 455° C. for propane and a temperature as low as 245-255° C. for propane in the presence of $SO_2$.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION AND BEST MODE

Figure 1:
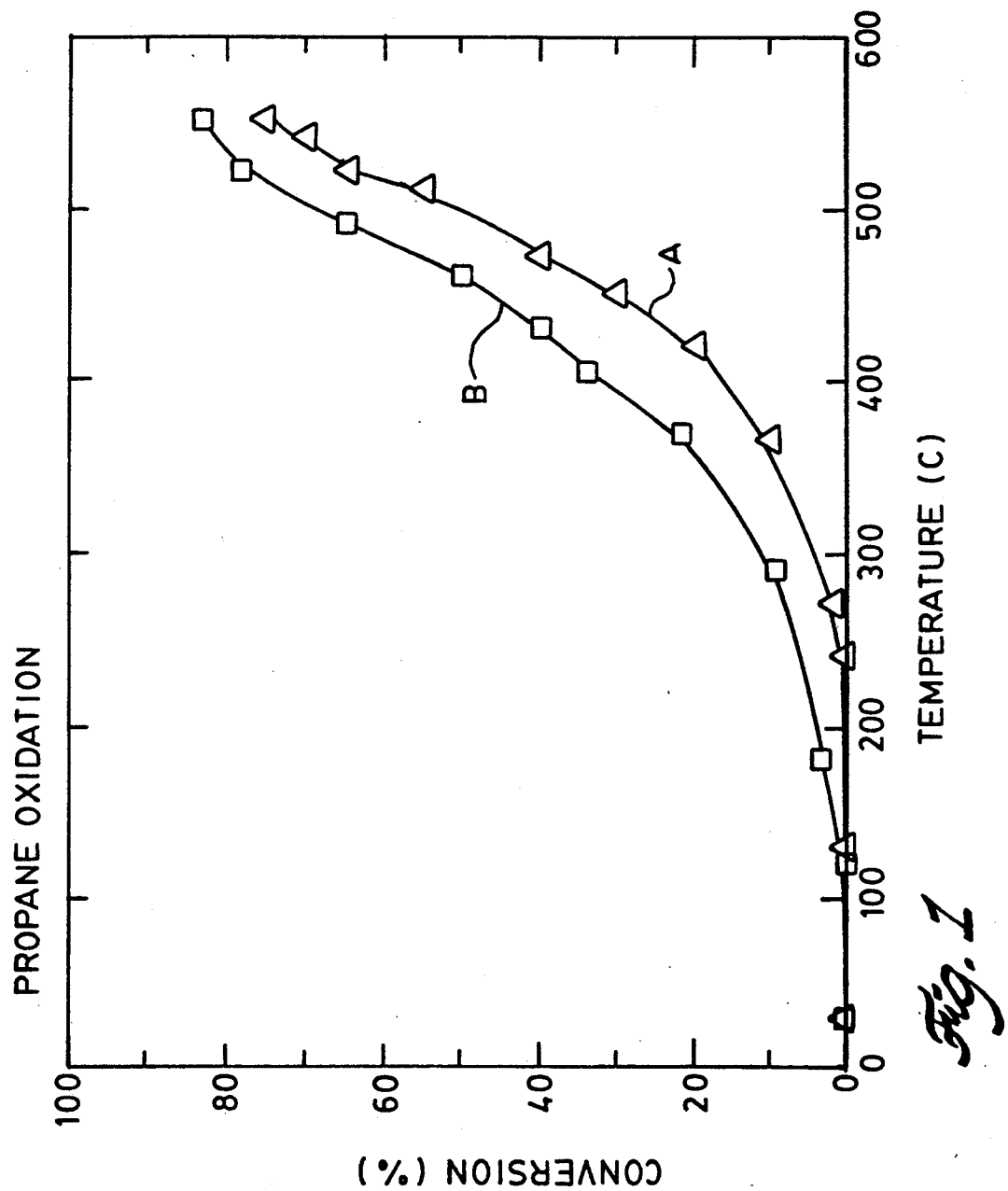
FIG. 1 is a graphical illustration of the variation of conversion efficiency as a function of temperature for platinum-based catalyst samples with and without the present invention for oxidation reactions of propane.

The oxidation catalyst of this invention consists essentially of a mechanical carrier having a support comprised substantially of alumina, a catalytic compound discontinuously supported on the support having a major constituent of platinum, and a discontinuous phase of titanium oxide on or adjacent a substantial number of exposed particles of the platinum.

The mechanical carrier is preferably comprised of a monolithic silicate structure (i.e., cordierite) in a honeycomb, although the configuration is not critical to the catalyst of this invention. The volume of the carrier structure is measured by its exterior dimensions. It is preferred that the micropore volume of the carrier material be relatively low and the macropore volume provide at least about 90% with pore diameters greater than 2000 angstroms. The surface area of the carrier, as opposed to the material of which the structure is made, should be maximized consistent with pressure drop limitations for particular application of the catalytic system of this invention.

Aluminum oxide must be the dominant or substantial ingredient of the support material or washcoat (greater than 50% by weight) because of its high surface area, strong adhesion, and low metal support interaction. Low metal interaction means it does not dissolve precious metals or cover them completely, thus making them inaccessible to reacting gases. It is desirable to form a slurry of gamma alumina particles, which may contain other alumina phases, to form an alumina washcoat on the cordierite monolith upon drying and calcination of the slurry. Such a washcoated monolith is brought in contact with a platinum-containing solution to form platinum coated alumina particles. Such particles, upon drying and calcination, receive the discontinuous phase of titanium oxide to form a collection of specially decorated particles.

The catalytic compound of the present invention comprises a major constituent of platinum supported on the alumina. Platinum must be present in an amount of at least 0.1-5% by weight of the alumina washcoat. Palladium may be present in such precious metal in an amount up to about 5% of the amount of Pt used and may include other components which act as stabilizers and/or interspersants which are well known in the art. Additionally, other components known to be beneficial in the oxidation of automotive exhaust gases may be present in minor amounts in the catalyst of the instant invention such as CaO, $Zr_2O_3$, NiO, BaO, and $Fe_2O_3$. If platinum is present in an amount in excess of 20% by weight, it will be excessively expensive and at some point will aggregate or form a continuous coating over the alumina which detracts from catalytic activity.

The discontinuous titania phase is intended to mean herein primarily the stable oxide form of $TiO_2$, but other forms, such as TiO, $Ti_2O_3$, $Ti_3O_5$, and $Ti_2O$, may be present in minor proportions of less than 2%. Titanium oxide may constitute up to 8% of the total weight of the catalyst. Discontinuous phase is meant herein to mean that the phase covers up to 40%, preferably 2-20%, of the grain surface of the catalytic compound and is up to 8% by weight, preferably 0.1-2.0%, of the total weight of the catalyst.

If $TiO_2$ is present in an amount greater than 8% by weight, the phase exhibits some continuous areas and conversion efficiency at low temperature is seriously affected. If $TiO_2$ is present in an amount less than 0.1% by weight, the ability of $TiO_2$ to supply oxygen to platinum is eliminated or becomes negligible.

The preferred method of making the oxidation catalyst comprises: (a) impregnating with platinum an alumina washcoat or support comprised substantially of alumina to produce a composite having 0.1-5% platinum; (b) impregnating the composite with an organo-titanium compound and decomposing such compound to form a discontinuous titanium oxide phase on the composite. The platinum applied to the washcoat or support may be added in a diluted aqueous solution containing chloroplatinic acid with said acid being present in amount required to deposit 0.1-5% by weight platinum. The ethanol and water are evaporated from the chloroplatinic acid solution coated alumina by heating to a temperature of about 80-100° C. and then subsequently calcining at a temperature in the range of 400-600° C., or, preferably in two stages at 320° C. for one hour and then at 600° C. for four hours.

The organo-titanium compound is selected from a group consisting of organo-titanates. A preferred example of such compound is butoxide, characterized by $Ti(OC_4H_9)_4$. Equivalents to butoxide are many titanium alkoxides. Organo-titanium compounds, particularly titanium butoxide, decompose at lower temperatures, substantially below the decomposition temperature of chloroplatinate. The organo-titanium compound is applied by dissolving the compound in liquid for wetting the composite, such as ethanol, the wetted composite being then calcined at a temperature of about 400-600° C. for 4-12 hours.

The discontinuous titania coating covers no greater than 40% of the platinum particles. The platinum may also be discontinuous as shown and thus titania is deemed discontinuous on or adjacent each exposed particle of catalytic compound. The decomposition products of heat treating platinum wetted alumina in air are separated crystallites of platinum and platinum oxide. Platinum oxide spreads out more on the substrate due to a greater wetting angle and the particles of platinum oxide coalesce more readily than platinum thereby increasing their volume slightly. Wetting the discontinuous crystallites of platinum and platinum oxide with an organo-titanium compound and then heating results in growing of titanium oxide on or around the platinum particles. Irregularities in the gamma alumina substrate, such as exposed crystallographic planes, contamination layers, or roughness due to geometry of nucleation sites, decrease the interfacial strength between platinum and gamma alumina and promote even greater discontinuities of the platinum particles.

Another way of stating the above method aspects, particularly for making a hydrocarbon conversion catalyst for use in automotive exhaust gas treatment, comprises: (a) preparing a residue by incipiently wetting a mixture of alumina and chloroplatinic acid in ethanol; (b) coating such precipitate with titanium butoxide carried in an organic solvent, said butoxide being present in an amount required to deposit less than 8.0% by weight $TiO_2$; and (c) drying and calcining the coated precipitate. Incipient wetting means use of an impregnation solution in a volume just sufficient to wet the substrate completely. The ratio of titanium butoxide to chloroplatinic acid is in the range of 0.02-150 gm/gm. The alumina is sized to the particle range of $5-5 \times 10^5$ nm. The drying is carried out by heating to a range of up to 100° C.; calcining is carried out in a range of 400-600° C. for a period of at least four hours.

The amount of organo-titanium compound introduced to the platinum catalyst is critical. The compound must be in the operational range of less than 8% by weight of the total catalyst and preferably is 0.1-2.0%. If the titanium compound is less than 0.1% by weight of the total catalyst, there would be an imperceptible amount of enhancement of the catalytic activity observed. If the titanium compound exceeds 8.0%, the catalytic activity of the platinum would be retarded by the titanium oxide covering a greater percentage of the platinum reducing its exposure. The titanium compound functions as a catalyst in combination with the platinum to aid in oxidation of the gases within the automotive emissions. The titanium oxide, in, its discontinuous configuration, functions during oxygen-lean conditions of the emissions to form lower oxides and additional oxygen. This may be represented by the equation:

$$2TiO_2 \rightarrow Ti_2O_3 + \tfrac{1}{2} O_2$$

During rich oxidation spikes of the emission gas, a reducing condition occurs where di-titanium trioxide combines with oxygen to form titanium dioxide represented by the formula:

$$Ti_2O_3 + \tfrac{1}{2} O_2 \rightarrow 2TiO_2$$

Titania resists $SO_2$ and $SO_3$ poisoning by virtue of its chemical properties. Titania does not react with $SO_2$ or $SO_3$ at temperatures above 300° C., and sulfates of $TiO_2$, such as $Ti(SO_4)_2$, and $TiOSO_4$ will not be stable above 300° C. The instability of the sulfate avoids poisoning by $SO_2$. This allows less Pt to be used to achieve the same degree of conversion efficiency.

To show the importance of process and chemical content variations, several samples were prepared and run; the data generated thereby is shown in the Figures.

Each of the samples involved impregnating gamma alumina by incipient wetness with a chloroplatinic acid; 50 grams of gamma alumina (20-40 mesh) were placed in a beaker and a 60 ml ethanol solution of 2 ml aqueous chloroplatinic acid (266.7 ml of platinum/ml) was added to it. The mixture was stirred well and placed at 80° C. to evaporate the ethanol. Sample A, prepared with the above processing, is characteristic of the prior art. To provide sample B, characteristic of this invention, five grams of the above platinum/alumina product were placed in a 10 ml ethanol solution of 0.25 grams titanium butoxide. The composition was stirred well and placed in an oven at 95° C. The mixture was occasionally stirred during drying.

Both samples, sample A (platinum/alumina) and sample B (titanate modified platinum/alumina), about five grams each, were calcined at 320° C for one hour and then at 600° C. for four hours. The catalytic activity for propane oxidation was determined on a flow reactor (2% $O_2$ at 30 Khr$^{-1}$) with the results as shown in FIG. 1. The light-off temperature for sample A (platinum/alumina catalyst) is about 495° C., while for sample B ($TiO_2/Pt/Al_2O_3$), it is about 455° C.

Figure 2:
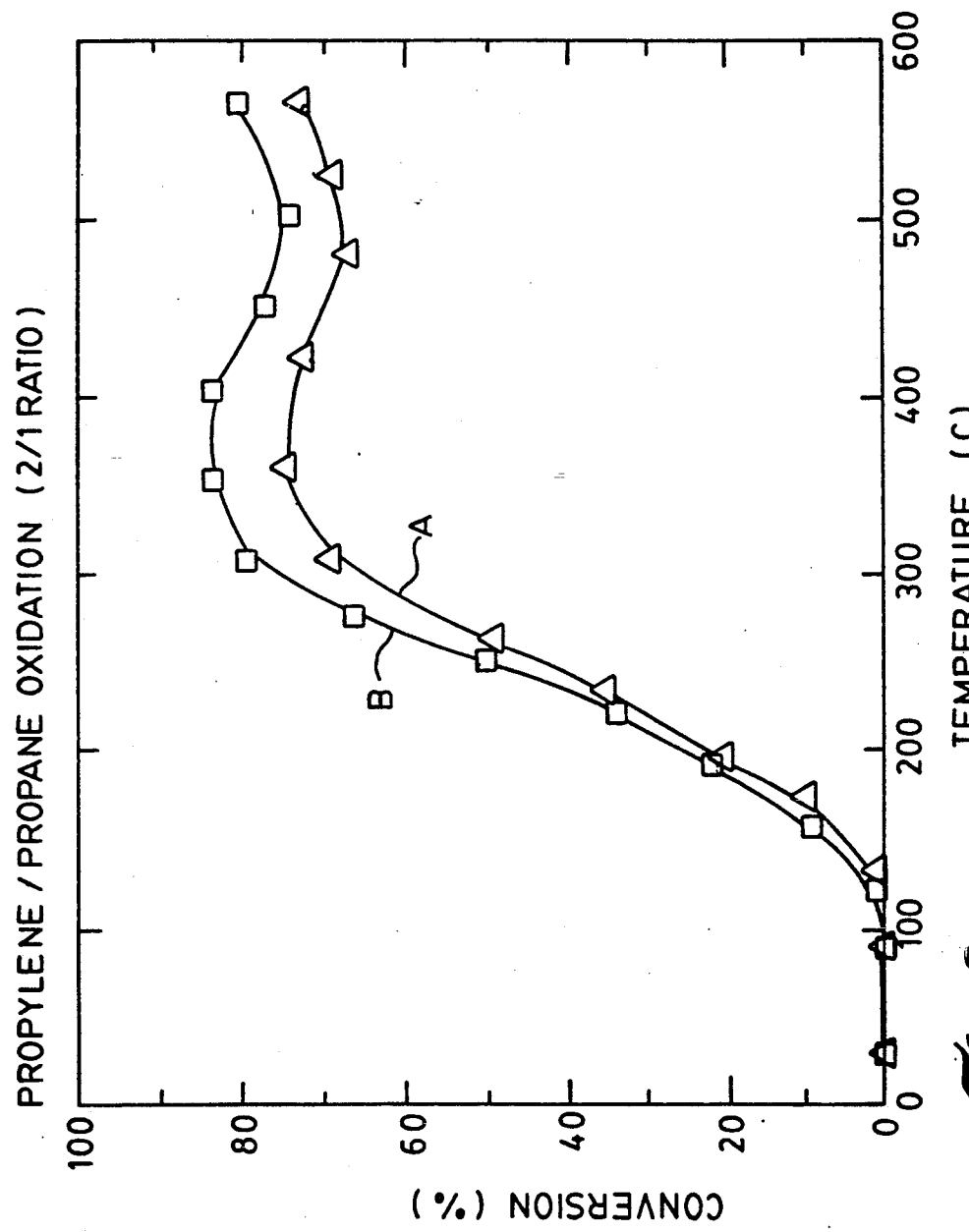
FIG. 2 is an illustration similar to that of FIG. 1 except that the oxidation reaction is for propane in the presence of $SO_2$.

When the same samples were subjected to propane oxidation without the presence of 20 ppm $SO_2$, conversion results were obtained as shown in FIG. 2. The light-off temperature for sample A (platinum/alumina catalyst) of the prior art was about 262° C., and for sample B ($TiO_2/Pt/Al_2O_3$), the light-off temperature was about 297° C.

Figure 3:
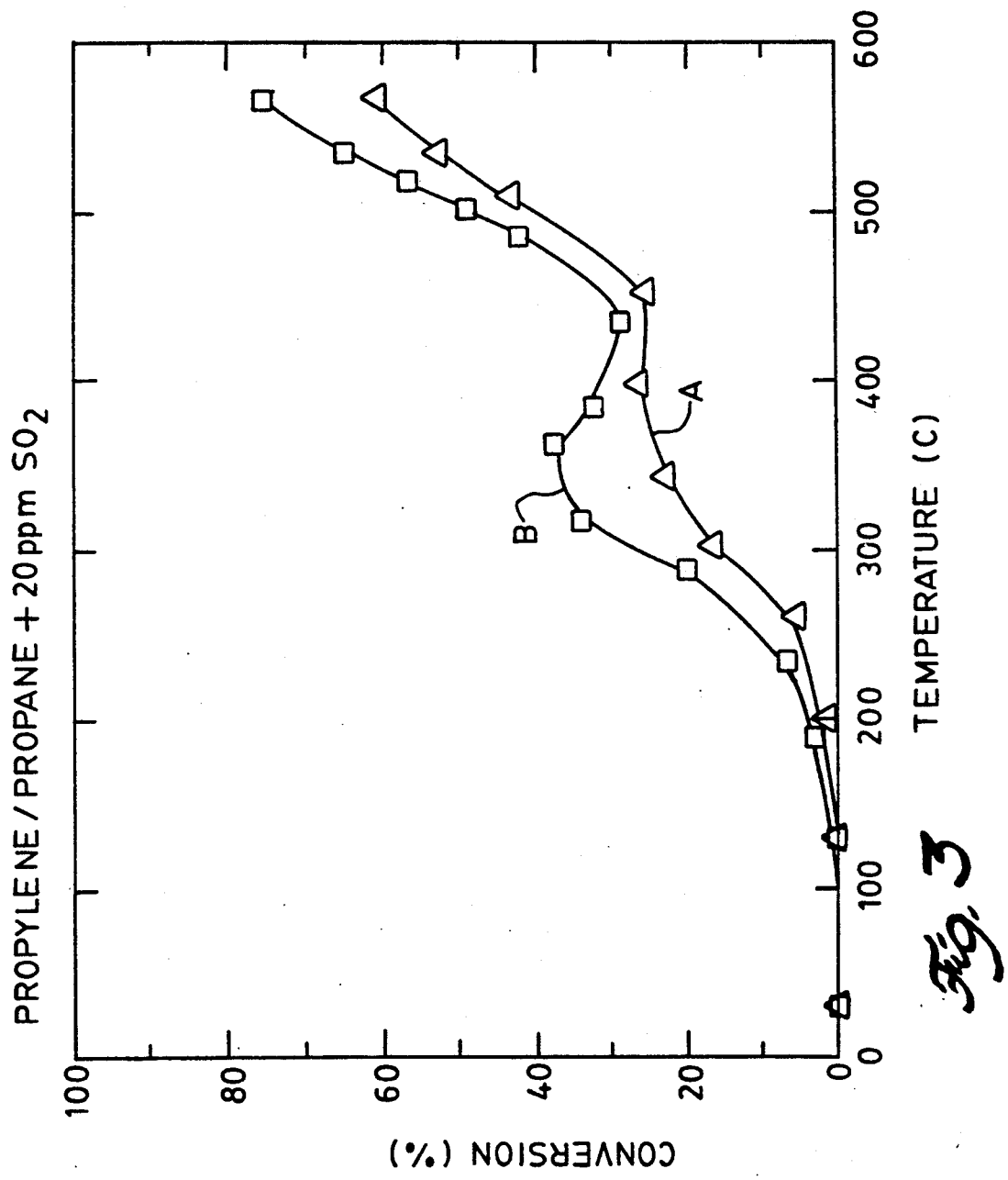
FIG. 3 is a graphical illustration similar to that of FIG. 2, but for an ethane oxidation reaction which also incorporates a small amount of sulfur dioxide.

When the same catalysts were subjected to an ethane oxidation gas mixture containing 20 ppm $SO_2$, the light-off data shown in FIG. 3 were obtained. The light-off temperature for sample A was about 523° C., whereas the light-off temperature for sample B was about 500° C. When the same samples were subjected to propane oxidation with 20 ppm $SO_2$, the light-off temperatures were respectively 262 versus 297° C.

Figure 4:
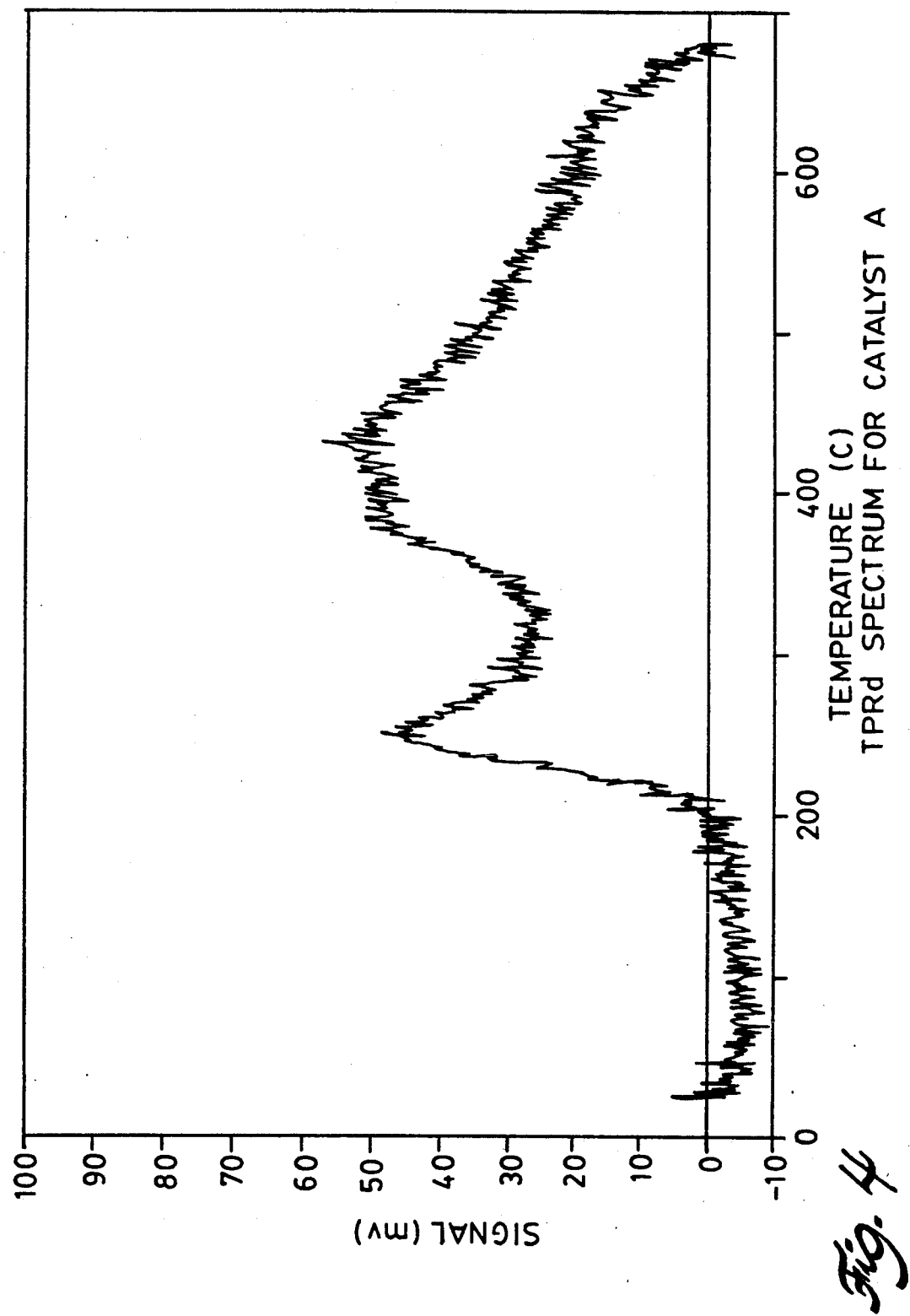
FIGS. 4 and 5 are temperature-programmed reduction spectra for prior art catalyst and the inventive catalyst respectively.
Figure 5:
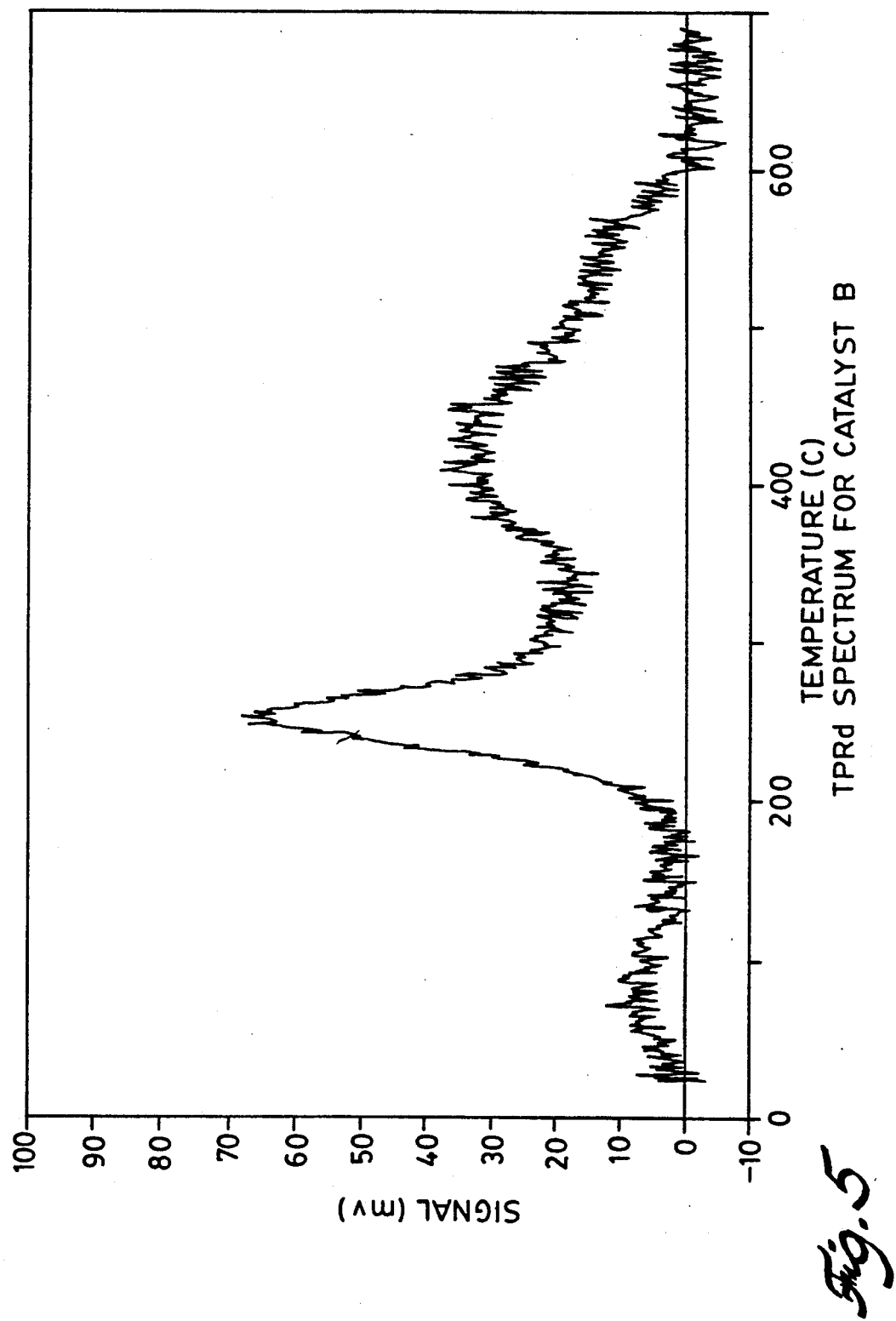

The temperature-programmed reduction (TPRd) spectra for catalysts A and B are shown in FIGS. 4 and 5. It is known that highly dispersed Pt reduces at higher temperature than crystalline Pt. The TPRd results indicate that a larger fraction of the Pt in catalyst B is present as larger crystallites The change in morphology of the Pt crystallites in catalyst B may result from the presence of the $TiO_2$ decoration.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of making an oxidation catalyst for use in automotive gas treatment, comprising:
   (a) impregnating with platinum a mechanical carrier having a support comprised substantially of alumina to produce a composite having, by weight, 0.1-5.0% platinum; and
   (b) impregnating the composite with an organo-titanium compound and decomposing such compound to form a discontinuous $TiO_2$ phase on or adjacent the exposed portions of the composite, said $TiO_2$ being present in an amount of 0.1-8.0% by weight of the total catalyst.

2. A method of making a hydrocarbon conversion catalyst for use in automotive exhaust gas treatment, comprising:
   (a) preparing a residue by incipiently wetting alumina with chloroplatinic acid in ethanol;
   (b) coating said residue with titanium butoxide carried in an organic solvent, said butoxide being present in an amount required to deposit $TiO_2$ discontinuously in an amount of 0.1-8.0% by weight of the catalyst; and
   (c) drying and calcining said coated residue.

3. The method as in claim 2, in which incipiently wetting means use of an impregnation solution in a volume just sufficient to wet said alumina completely.

4. The method as in claim 2, in which the ratio of titanium butoxide to chloroplatinic acid is in the range of 0.02-150 gm/gm.

5. The method as in claim 2, in which said alumina is sized in the particle range of 5-5×10$^5$ nm.

6. The method as in claim 2, in which drying is carried out by heating to a range of up to 100° C., and said calcining is carried out in a range of 400-600° C. for a period of at least four hours.

* * * * *